United States Patent [19]

Zschalich et al.

[11] Patent Number: 5,310,530
[45] Date of Patent: May 10, 1994

[54] METHOD FOR DECREASING THE SULFUR CONTENT OF PHOSPHOROUS

[75] Inventors: Arndt Zschalich, Zscherndorf; Rudolf Schumann, Raguhn, both of Fed. Rep. of Germany

[73] Assignee: Chemie AG Bitterfeld-Wolfen, Bitterfeld, Fed. Rep. of Germany

[21] Appl. No.: 117,884

[22] Filed: Sep. 7, 1993

Related U.S. Application Data

[63] Continuation of Ser. No. 871,453, Apr. 21, 1992, abandoned.

[51] Int. Cl.$^5$ ............................................. C01B 25/04
[52] U.S. Cl. .................................................. 423/322
[58] Field of Search ........................................ 423/322

[56] References Cited

U.S. PATENT DOCUMENTS 3,780,164  12/1973  Muller et al. ................... 423/322

FOREIGN PATENT DOCUMENTS 76482    10/1970  Fed. Rep. of Germany .
220012   3/1985   Fed. Rep. of Germany ...... 423/322
667501   6/1979   U.S.S.R. .......................... 423/322
1224272  3/1971   United Kingdom ............. 423/322

*Primary Examiner*—Wayne Langel
*Attorney, Agent, or Firm*—Jordan and Hamburg

[57] ABSTRACT

A method for purifying phosphorus to insure a low sulfur content involves intensively mixing phosphorus and concentrated sulfuric acid to form an emulsion, breaking the emulsion by contact with water or dilute sulfuric acid, and then immediately separating the phosphorus and diluted sulfuric acid. The separated phosphorus is then stored in water until further processing is desired and is characterized by a sulfur content as low as about 50 ppm.

9 Claims, No Drawings

METHOD FOR DECREASING THE SULFUR CONTENT OF PHOSPHOROUS

This application is a continuation of application Ser. No. 07/871,453, filed Apr. 21, 1992, abandoned.

BACKGROUND OF THE INVENTION

The invention relates to a method for purifying phosphorus, as a result of which the area of application of products produced from phosphorus can be expanded due to a low sulfur content.

Generally, organic impurities up to 0.3% are contained in technical grade white phosphorus. These impurities interfere with further processing and must therefore be removed before subsequent reaction. According to GDR patent 76,482, removal of the interfering organic impurity is possible by a treatment of the phosphorus with sulfuric acid. The phosphorus to be purified is intensively mixed briefly with highly concentrated sulfuric acid in a special apparatus. During this mixing, an emulsion is formed. In order to separate the concentrated sulfuric acid rapidly from the emulsion, the latter is passed into warm water. A rapid separation of the emulsion is required in order to avoid explosive reactions between phosphorus and sulfuric acid. Due to its higher specific weight, the purified phosphorus sinks countercurrently to the warm water that is being passed in and, to remove occluded sulfuric acid, is passed through a packed column and is subsequently collected in a tank of about 20 m³ capacity that is disposed below the column. Here the phosphorus is stored, frequently for several days, before it is used.

The approximately 5 to 10% sulfuric acid solution, which furthermore results from the emulsion, is largely removed as effluent from the plant. Due to back-mixing which sets in, the concentration of the sulfuric acid in the column and in the tank increases very quickly. Here also, it reaches concentrations of about 5 to 10%.

The purifying effect achieved with this procedure is good. For some applications, however, the relatively high increase in the sulfur content of the phosphorus, which is purified in this manner, results form the reaction of the sulfuric acid with the phosphorus during the purification procedure and is a disadvantage. In general, concentrations of 500 ppm and, in rare cases, concentrations even as high as 2,000 ppm are achieved. In a side reaction, a small portion of the sulfuric acid is reduced by the phosphorus and therefore leads to an increase in the sulfur content of the phosphorus. In certain applications, the high sulfur content leads to undesirable side reactions. For example, hydrogen sulfide is formed as a by-product during the processing of the phosphorus to phosphane. It is also disturbing that such phosphorus, upon contact with water, gives off poisonous hydrogen sulfide and thereby makes handling and transport more difficult.

SUMMARY OF THE INVENTION

It is an object of the invention to modify the purification process for phosphorus, which involves intensive mixing with concentrated sulfuric acid, to such an extent that the purified phosphorus contains little sulfur an thus is also suitable for sensitive application purposes. Pursuant to the invention, the sulfur content in the phosphorus is decreased greatly if, after the known treatment of technical grade phosphorus with sulfuric acid and breaking the resulting emulsion with water or dilute acid, the phosphorus is separated immediately form the refining waste water. Surprisingly, it has been found that the proportion of sulfur, found in the phosphorus after purification, can be influenced by shortening the contact time between the purified phosphorus and the dilute sulfuric acid formed in the purification process. The sulfur content in the purified phosphorus is all the lesser, the faster the purified phosphorus is removed form the dilute sulfuric acid formed during the purification process.

By removing the purified phosphorus immediately from the dilute sulfuric acid, a considerably lower sulfur content of about 50 ppm is achieved. The immediate separation of the phosphorus form the sulfuric acid is achieved by immediately drawing off the phosphorus from the reaction system or by quickly removing all of the dilute sulfuric acid from the reaction system.

DESCRIPTION OF THE PREFERRED EMBODIMENTS

The invention will now be described by 4 examples.

EXAMPLE 1

In the same reactor used for a comparison example, 1,000 kg/hour phosphorus, which contains 2,600 ppm of oil and less than 20 ppm of sulfur, and 100 kg/hour of sulfuric acid monohydrate are continuously mixed intensively at 60° C. Immediately after leaving the refining reactor above a packed column 3 m high and 600 mm in diameter, the resulting emulsion is passed into highly diluted sulfuric acid for the separation. For the complete removal of the sulfuric acid form the sinking phosphorus, 10 m³/hour of water at 70° C. are supplied below the packed column in order to wash the phosphorus countercurrently. Due to the large amount of water, the dilute sulfuric acid is completely removed even before the phosphorus enters the column and is separated immediately and completely from the phosphorus. The phosphorus is collected in a 20 m³ tank which is disposed below the column, stored under water for industrial use and, after 24 hours, conveyed by hydrostatic pressure over a standpipe to a second tank for further processing.

This phosphorus contained 180 ppm of sulfur and 25 ppm of oil.

EXAMPLE 2

Through an apparatus described in the Comparison Example and under the same conditions, 1000 kg/hour of phosphorus and 100 kg/hour of sulfuric acid monohydrate are passed. However, 100 to 900 kg/hour of phosphorus are collected in a funnel below the column and passed immediately, by the hydrostatic pressure of the liquid column, into a second tank and thus separated form the remaining phosphorus. The phosphorus is stored there under normal water for industrial use. It contains 40 ppm of sulfur and 25 ppm of oil.

EXAMPLE 3 through the apparatus described in the Comparison Example and under the same conditions, 1,000 kg/hour of phosphorus, containing 2,600 ppm of oil and less than 20 ppm of sulfur, and 100 kg/hour of sulfuric acid monohydrate are passed. However, 1,000 L or water at 70° C. are supplied below the packed column. Below the column, 100 to 900 kg of phosphorus per hour are then collected in a funnel and passed immediately by the hydrostatic pressure of the liquid column into a second tank and so separated from the remaining phosphorus. The phosphorus is stored there under normal water for industrial use. It contains 30 ppm of sulfur and 25 ppm of oil.

EXAMPLE 4

In a reactor for purifying phosphorus, 1,000 kg/hour of phosphorous, which contains 2600 ppm of oil and less than 20 ppm of sulfur, and 100 kg/hour of sulfuric acid monohydrate are intensively mixed continuously at 60° C. The resulting emulsion, immediately on leaving the refining reactor above an also 3 m high packed column, which stands on a tank of 20 m$^3$ capacity, is passed into dilute sulfuric acid in order to separate the phosphorus. In order largely to avoid back-mixing, the column is equipped with 3 one-hole bottoms and has a diameter of only 200 mm. An additional 300 L/hour of water at 70° C. are supplied below the packed column. With this and the water displaced from the tank, the phosphorus is washed countercurrently. The dilute sulfuric acid is drawn off at the head of the column. The phosphorus is collected in the 20 m$^3$ tank disposed below the column and, when required, moved by hydrostatic pressure over a standpipe for further processing to a second tank. This phosphorus contains 25 ppm of oil and 50 ppm of sulfur.

COMPARISON EXAMPLE

In a reactor for purifying phosphorus, 1,000 kg/hour of phosphorus, which contains 2,600 ppm of oil and less than 20 ppm of sulfur, and 100 kg/hour of sulfuric acid monohydrate are continuously mixed intensively at 60° C. The resulting emulsion, immediately upon leaving the refining reactor above a packed column 3 m high and 600 mm in diameter, which stands on a tank with a capacity of 20 m$^3$, is passed into dilute sulfuric acid to separate out the phosphorus. For the complete removal of the sulfuric acid from the sinking phosphorus, 300 L/hour of 70° C. water are supplied below the packed column. With this and the amount of water displaced from the tank, the phosphorus is washed countercurrently. The dilute sulfuric acid is drawn off at the head. The phosphorus is collected in the 20 m$^3$ tank disposed below the column and stored under dilute sulfuric acid, which reaches the tank because of the back-mixing in the column. After 24 hours, the phosphorus is moved by hydrostatic pressure over a standpipe to a second tank for further processing. Until it left the tank, the phosphorus was washed with 300/L per hour of water at 70° C. This phosphorus contained 1,150 ppm of sulfur and 25 ppm of oil.

We claim:

1. A method for purifying phosphorus, comprising intensively mixing phosphorus and concentrated sulfuric acid to form an emulsion; breaking said emulsion into phosphorus and diluted sulfuric acid by contacting said emulsion with a diluent; and then immediately separating said phosphorus from said diluted sulfuric acid.

2. A method as in claim 1, wherein said diluent is selected from the group consisting of water and dilute sulfuric acid.

3. A method as in claim 1, wherein said separating step comprises immediately removing said phosphorus from said diluted sulfuric acid.

4. A method as in claim 1, wherein said separating step comprises immediately removing said diluted sulfuric acid from said phosphorus.

5. A method as in claim 1, wherein said removing comprises washing said phosphorus countercurrently with water.

6. A method as in claim 5, wherein said water has a temperature of 70° C.

7. A method as in claim 1, further comprising storing said phosphorus in water after separating said phosphorus from said diluted sulfuric acid.

8. A method for purifying phosphorus, comprising intensively mixing phosphorus and concentrated sulfuric acid to form an emulsion; breaking said emulsion into phosphorus and diluted sulfuric acid by contacting said emulsion with a diluent; and then immediately separating said phosphorus from said diluted sulfuric acid by drawing off said phosphorus.

9. A method for purifying phosphorus, comprising intensively mixing phosphorus and concentrated sulfuric acid to form an emulsion; breaking said emulsion into phosphorus and diluted sulfuric acid by contacting said emulsion with a diluent; and then immediately separating said phosphorus from said diluted sulfuric acid by drawing off said diluted sulfuric acid.

* * * * *